US009856963B2

(12) United States Patent
Ikeda

(10) Patent No.: US 9,856,963 B2
(45) Date of Patent: Jan. 2, 2018

(54) DRIVING FORCE TRANSMISSION MECHANISM

(71) Applicant: Keihin Corporation, Tokyo (JP)

(72) Inventor: Shintaro Ikeda, Kai (JP)

(73) Assignee: Keihin Corporation, Tokyo (JP)

( * ) Notice: Subject to any disclaimer, the term of this patent is extended or adjusted under 35 U.S.C. 154(b) by 211 days.

(21) Appl. No.: 14/743,372

(22) Filed: Jun. 18, 2015

(65) Prior Publication Data
US 2015/0285361 A1    Oct. 8, 2015

Related U.S. Application Data

(63) Continuation of application No. 12/890,162, filed on Sep. 24, 2010, now abandoned.

(30) Foreign Application Priority Data

Sep. 25, 2009    (JP) ................. 2009-220733

(51) Int. Cl.
F16H 57/02    (2012.01)
F16H 55/17    (2006.01)
(Continued)

(52) U.S. Cl.
CPC ......... F16H 55/17 (2013.01); B60H 1/00664 (2013.01); F16H 19/00 (2013.01);
(Continued)

(58) Field of Classification Search
CPC ........ F16H 55/17; F16H 19/00; F16H 19/001; F16H 19/04; F16H 2057/0056; B60H 1/00664
See application file for complete search history.

(56) References Cited

U.S. PATENT DOCUMENTS 1,432,741 A    10/1922  Briggs
1,437,017 A    11/1922  Roberts
(Continued)

FOREIGN PATENT DOCUMENTS

DE          707242      6/1941
DE    102007016019 B3    9/2008
(Continued)

OTHER PUBLICATIONS

European Search Report for Application No. 10177227.5, dated Dec. 2, 2010, 3 pages.
(Continued)

*Primary Examiner* — Zakaria Elahmadi
(74) *Attorney, Agent, or Firm* — Nelson Mullins Riley & Scarborough LLP; Anthony A. Laurentano

(57) ABSTRACT

A driving force transmission mechanism is equipped with a first gear attached to a drive source, a second gear enmeshed with the first gear, and a damper shaft enmeshed mutually with the second gear and with a rack member of an air mixing damper. A first locator part formed on the second gear is inserted in a first locator groove in the first gear, while additionally, a second locator part is inserted with respect to a second locator groove in a damper gear. Further, a first narrow tooth formed on the first gear enmeshes with a meshing groove of the first locator part, whereas a second narrow tooth formed on the damper gear enmeshes with another meshing groove of the second locator part.

3 Claims, 10 Drawing Sheets

(51) Int. Cl.
  *B60H 1/00* (2006.01)
  *F16H 19/00* (2006.01)
  *F16H 19/04* (2006.01)
  *F16H 57/00* (2012.01)

(52) U.S. Cl.
  CPC ............ *F16H 19/001* (2013.01); *F16H 19/04* (2013.01); *F16H 2057/0056* (2013.01); *Y10T 74/19642* (2015.01)

(56) References Cited

U.S. PATENT DOCUMENTS

| | | | |
|---|---|---|---|
| 3,650,156 A | 3/1972 | Thomas | |
| 4,012,964 A * | 3/1977 | Lee | B21K 1/466 475/17 |
| 4,057,959 A * | 11/1977 | Insley | G04B 19/21 235/133 R |
| 4,197,436 A | 4/1980 | Ishikawa et al. | |
| 4,722,239 A * | 2/1988 | Fleck | F16H 27/08 74/435 |
| 4,773,289 A * | 9/1988 | Graffin | B23P 19/065 192/150 |
| 5,046,378 A | 9/1991 | Bannister et al. | |
| 5,217,152 A * | 6/1993 | Suzuki | B41J 15/06 226/120 |
| 5,221,237 A * | 6/1993 | Weber | F16H 27/04 475/14 |
| 5,284,064 A * | 2/1994 | Green | F16H 27/08 192/142 R |
| 5,605,072 A * | 2/1997 | Schmidt | B41J 23/02 192/126 |
| 5,946,975 A * | 9/1999 | Yun | F16H 55/0806 74/457 |
| 6,095,007 A * | 8/2000 | Brewington | B41J 11/66 192/48.92 |
| 6,182,550 B1 * | 2/2001 | Brewington | B41J 11/66 100/288 |
| 6,301,981 B1 * | 10/2001 | Oechslin | G04B 15/06 185/38 |
| 6,354,935 B1 | 3/2002 | Kurokawa et al. | |
| 6,644,139 B2 * | 11/2003 | Liu | A63H 29/22 446/330 |
| 6,684,743 B1 * | 2/2004 | Brewington | B41J 11/66 100/288 |
| 7,762,513 B2 * | 7/2010 | Sawai | F16M 11/10 248/349.1 |
| 2006/0191364 A1 * | 8/2006 | Linke | F02D 11/107 74/411 |
| 2008/0196530 A1 * | 8/2008 | Shimada | F16H 1/20 74/457 |
| 2009/0282936 A1 * | 11/2009 | Chen | B25B 13/467 74/116 |
| 2010/0199790 A1 * | 8/2010 | Trischberger | B60R 25/02 74/74 |
| 2010/0326224 A1 * | 12/2010 | Shimizu | F16H 57/0006 74/411 |
| 2011/0168116 A1 * | 7/2011 | Billot | F02N 15/046 123/179.1 |
| 2011/0219895 A1 * | 9/2011 | Sano | B60Q 1/1476 74/412 R |
| 2011/0281682 A1 * | 11/2011 | Scekic | F16H 1/20 475/331 |
| 2012/0023995 A1 * | 2/2012 | Lee | F25C 5/005 62/340 |

FOREIGN PATENT DOCUMENTS

| | | |
|---|---|---|
| EP | 1044832 A2 | 10/2000 |
| EP | 1520736 A2 | 4/2005 |
| FR | 2806174 A1 | 9/2001 |
| JP | 1-171960 | 12/1989 |
| JP | 2001-147060 | 5/2001 |
| JP | 2001-163029 | 6/2001 |
| JP | 2007-236580 | 9/2007 |
| JP | 2009-2422 | 1/2009 |
| WO | 2009/074614 A1 | 6/2009 |

OTHER PUBLICATIONS

Japanese Office Action for Application No. 2009-220733, 3 pages, dated Jan. 7, 2014.
Japanese Office Action for Application No. 2009-220733, 3 pages, dated May 28, 2013.

\* cited by examiner

DRIVING FORCE TRANSMISSION MECHANISM

CROSS-REFERENCE TO RELATED APPLICATION

This application is a Continuation application of U.S. patent application Ser. No. 12/890,162 filed Sep. 24, 2010 which is based upon and claims the benefit of priority from Japanese Patent Application No. 2009-220733 filed on Sep. 25, 2009, of which the contents are incorporated herein by reference.

BACKGROUND OF THE INVENTION

Field of the Invention

The present invention relates to a driving force transmission mechanism for transmitting and outputting an output force of a driving section via a drive gear and a driven gear.

Description of the Related Art

Heretofore, in a vehicular air conditioning apparatus, which is mounted in a passenger vehicle, cool air that is cooled by an evaporator serving as a cooling means and warm air that is heated by a heater core serving as a heating means are mixed together in a housing thereof by adjusting a degree of opening of an air mixing damper, and such mixed air is blown out selectively by opening and closing outlet doors, which are provided with respect to outlet ports disposed in the vehicle compartment. The air mixing damper and the outlet dampers include shafts that are axially supported with respect to the housing, such that by rotating the air mixing damper and the outlet dampers by given angles about the shafts, a mixing ratio of warm air and cool air or an opened/closed state of the outlet ports can be switched.

With the aforementioned vehicular air conditioning apparatus, for example, at a time of opening or closing the air mixing damper or the outlet dampers, a driving force transmission mechanism is used, which is capable of transmitting a driving force of a drive source to the air mixing damper, etc., through a plurality of gears.

For example, as disclosed in Japanese Laid-Open Patent Publication No. 2001-147060, such a driving force transmission mechanism is equipped with a drive gear connected to a drive source, a first transmission gear enmeshed with a small gear on the drive gear, a second transmission gear enmeshed with a second gear on the first transmission gear, and an output gear enmeshed with the second transmission gear and to which a driving force from the drive gear is transmitted. The output gear comprises one fat tooth, a tooth thickness of which is comparatively thick. The fat tooth enmeshes with a gear groove formed in a long tooth region of the second transmission gear where the gear width is comparatively long.

However, with the driving force transmission mechanism according to the prior art, in the case that a clearance is set such that an enmeshed state between the plurality of teeth provided on the small gear of the output gear, the tooth thickness of which is small, and the teeth provided on the second transmission gear, i.e., a mutually enmeshed state (hooked state) between the teeth, is made appropriate, meshing (hooking) between the fat tooth of the output gear and the second transmission gear becomes insufficient, and proper transmission of the driving force cannot be realized.

SUMMARY OF THE INVENTION

A general object of the present invention is to provide a driving force transmission mechanism, in which positioning of a drive gear and a driven gear can easily be carried out when the drive gear and the driven gear are assembled together. Additionally, the driving force transmission mechanism also enables transmission of a driving force from the drive gear to the driven gear to be performed reliably and effectively.

The present invention is characterized by a driving force transmission mechanism for transmitting a driving force from a driving section, comprising a drive gear connected to the driving section and having a plurality of first gear teeth on an outer circumferential region thereof, a driven gear having a plurality of second gear teeth on an outer circumferential region thereof, which are enmeshed with the first gear teeth, the driven gear being enmeshed with the drive gear, a positioning member provided on the outer circumferential regions of the drive gear and the driven gear, the positioning member being adjacent to the first gear teeth or the second gear teeth, for performing positioning of the drive gear and the driven gear in a direction of rotation thereof, and a meshing member disposed at an interior of the positioning member for causing the drive gear and the driven gear to enmesh mutually.

In accordance with the present invention, on outer circumferential regions of the drive gear and the driven gear that make up the driving force transmission mechanism, a positioning member that lies adjacent to the first and second gear teeth is provided, and when the drive gear and the driven gear are assembled together, positioning in the rotational direction is carried out by means of the positioning member. Together therewith, by means of the meshing member disposed in the interior of the positioning member, the drive gear and the driven gear become enmeshed mutually at the positioning member.

Accordingly, when the drive gear and the driven gear are assembled, since relative positioning thereof in the direction of rotation can easily be performed by the positioning member, which is disposed on the outer circumferential regions of the drive gear and the driven gear, ease of assembly of the driving force transmission mechanism can be enhanced. Together therewith, since with the positioning member, meshing of the drive gear and the driven gear can be brought about by the meshing member, even at the positioning member, the driving force from the drive gear can be transmitted reliably and effectively to the driven gear via the meshing member.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
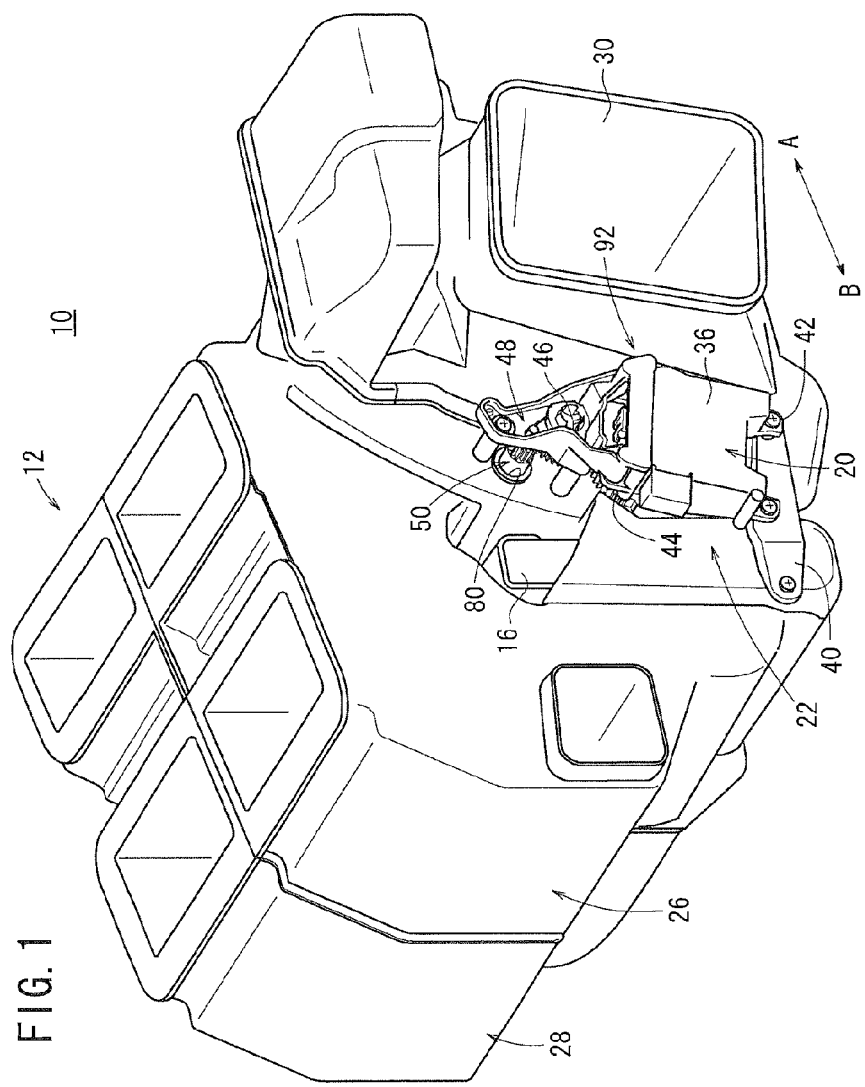
FIG. 1 is an exterior perspective view of a vehicular air conditioning apparatus to which a driving force transmission mechanism according to an embodiment of the present invention is applied.

In FIG. 1, reference numeral 10 indicates a vehicular air conditioning apparatus to which a driving force transmission mechanism according to an embodiment of the present invention is applied.

Figure 2:
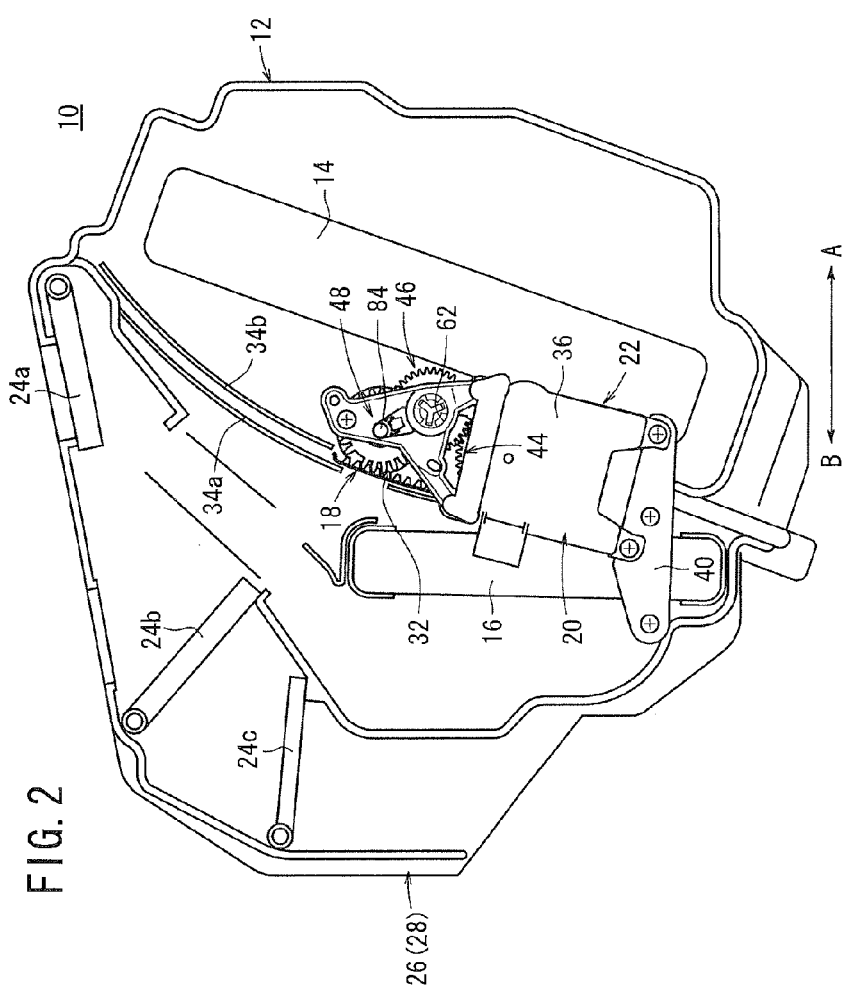
FIG. 2 is an overall cross sectional view of the vehicular air conditioning apparatus shown in FIG. 1.

As shown in FIGS. 1 and 2, the vehicular air conditioning apparatus 10 includes a casing 12 constituted by a plurality of respective air passages therein, an evaporator 14 arranged in the interior of the casing 12 that cools the air, a heater core 16 for heating the air, an air mixing damper (switching damper) 18 that performs heat exchange by means of the evaporator 14 and the heater core 16 on air that is introduced to the interior of the casing 12, and which mixes at a predetermined mixing ratio cool air and warm air having been adjusted in temperature, thereby producing mixed air, and a driving force transmission mechanism 22 that transmits a driving force of a drive source (driving section) 20, which is disposed on a side surface of the casing 12, to the air mixing damper 18 for causing rotary displacement thereof. In the interior of the casing 12, a plurality of outlet port dampers 24a to 24c are provided for selectively supplying into the vehicle compartment the mixed air from each of the opened outlet ports.

The vehicular air conditioning apparatus 10 is installed such that the right side shown in FIG. 1 (the direction of the arrow A) forms a front side thereof, and the left side shown in FIG. 1 (the direction of the arrow B) forms a rear side thereof. Thus, in the explanations given below, the arrow A direction shall be referred to as a forward direction, whereas the arrow B direction shall be referred to as a rearward direction.

The casing 12 is made up from substantially symmetrically shaped first and second divided casings 26, 28. In an open portion thereof that opens on a side of the first divided casing 26, a duct 30 is installed, which is connected to a blower fan, through which air is introduced into the interior of the casing 12.

Further, in the interior of the casing 12, the evaporator 14 is disposed, which is positioned in the vicinity of an opening portion at the forward side in the vehicular air conditioning apparatus 10. Also, the heater core 16 is separated a predetermined distance from the evaporator 14 and disposed on the rearward side in the casing 12. The air mixing damper 18 is disposed between the evaporator 14 and the heater core 16, for adjusting the flow amount of air, which has been cooled by the evaporator 14, and which flows to the side of the heater core 16 when flowing toward the downstream side in the casing 12.

Figure 3:
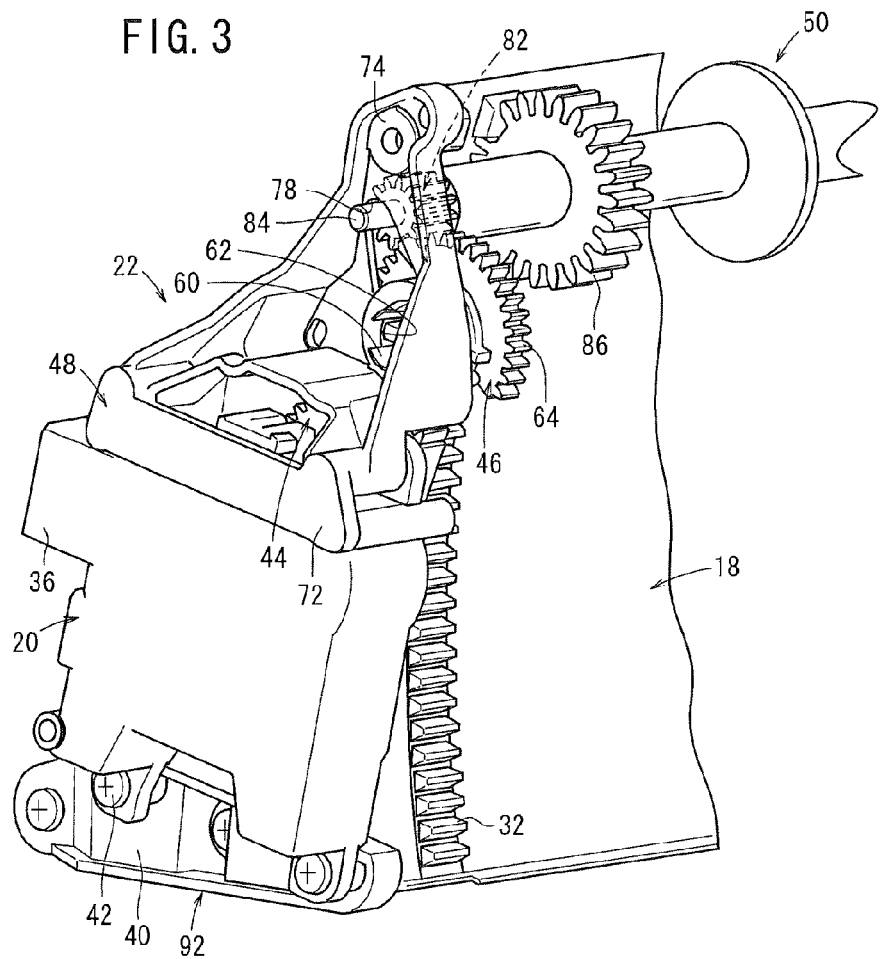
FIG. 3 is a perspective view with partial omission showing the relationship between a drive source, a driving force transmission mechanism, and an air mixing damper.
Figure 4:
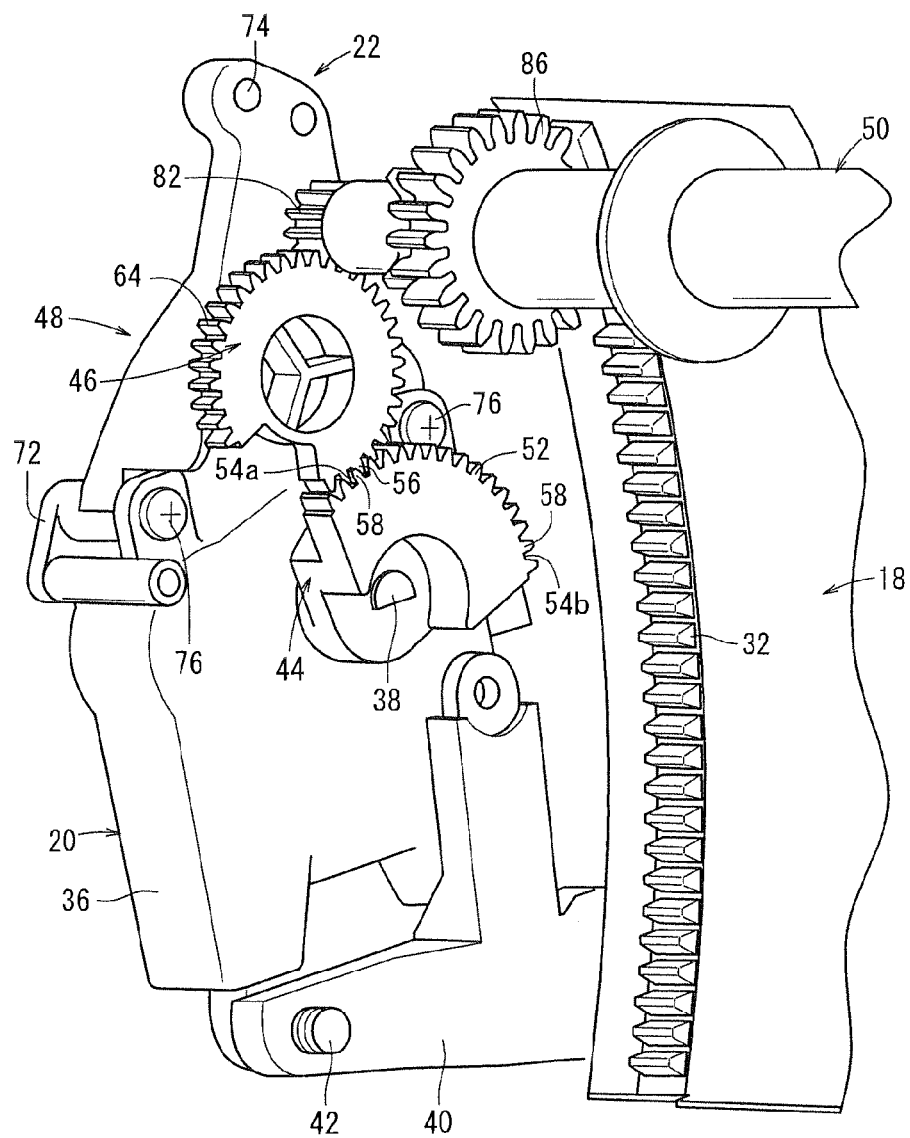
FIG. 4 is a perspective view with partial omission showing the features of FIG. 3, as seen from a different direction.
Figure 5:
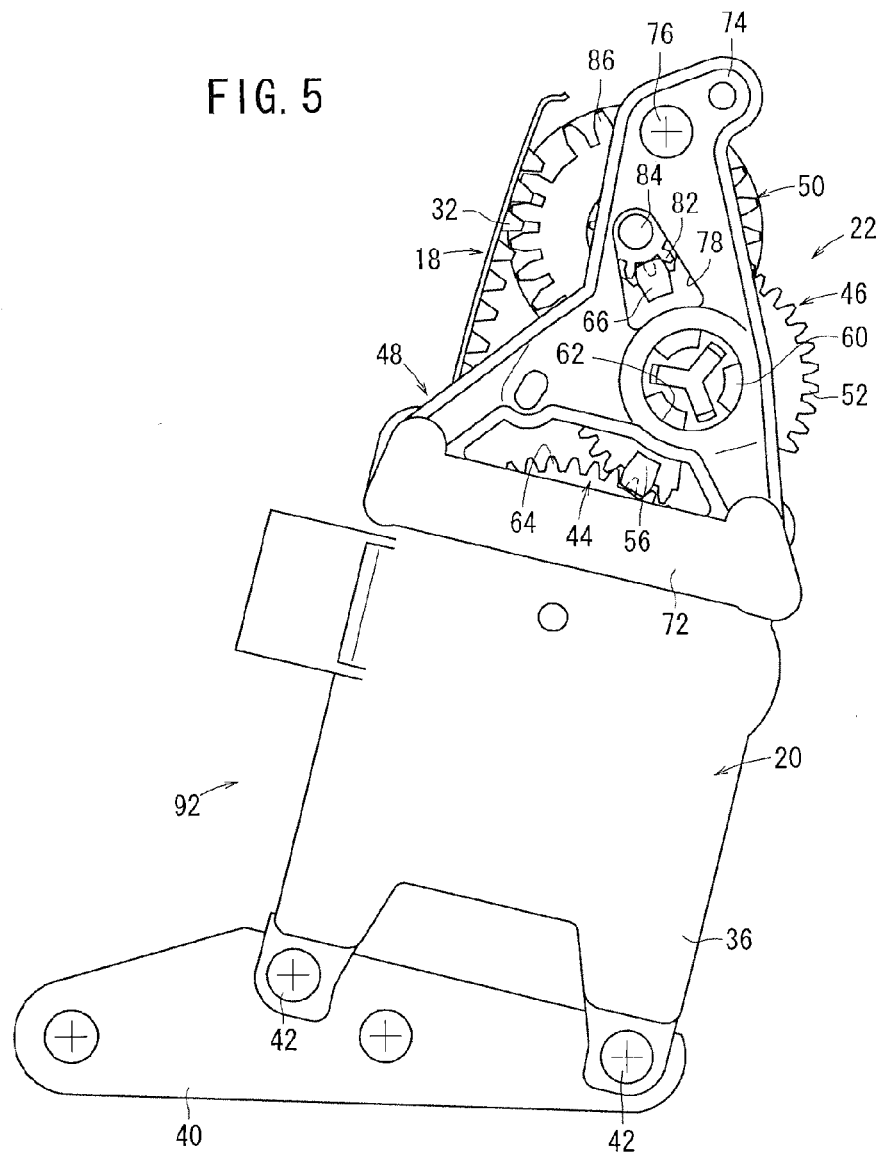
FIG. 5 is a front view of a driving force transmission unit made up from a driving section and the driving force transmission mechanism.

As shown in FIGS. 2 to 4, the air mixing damper 18 comprises a plate, which is arcuate shaped in cross section having a comparatively large radius of curvature, and which is formed with a substantially constant thickness. In addition, the air mixing damper 18 is disposed respectively in the first and second divided casings 26, 28. The air mixing damper 18 is disposed so as to be convexly shaped in a direction separating away from the evaporator 14.

On the other hand, as shown in FIGS. 3 and 4, on an inner wall surface of the air mixing damper 18 facing the evaporator 14, a rack member 32 is formed, which is enmeshed with a later-described damper shaft 50 of the driving force transmission mechanism 22. The rack member 32 extends along inner wall surfaces of the first and second divided casings 26, 28 from one end portion to the other end portion of the air mixing damper 18, facing the inner wall surfaces of the first and second divided casings 26, 28.

Further, the air mixing damper 18 is disposed in a widthwise direction along the casing 12. Both side ends of the air mixing damper 18 are guided along a pair of guide walls 34a, 34b, the guide walls 34a, 34b being disposed on inner wall surfaces of the first and second divided casings 26, 28. In the following description, an explanation shall be given only of the air mixing damper 18 disposed on the side of the first divided casing 26.

More specifically, in the event that the air mixing damper 18 is positioned downward so as to face the heater core 16 in the interior of the casing 12, air that passes through the evaporator 14 is prevented by the air mixing damper 18 from flowing through to the heater core 16. On the other hand, in the event that the air mixing damper 18 is moved upwardly away from the heater core 16, air that passes through the evaporator 14 is allowed to flow to the heater core 16. Further, if the air mixing damper 18 is disposed in an intermediate position, a portion of the air that passes through the evaporator 14 flows through to the heater core 16, whereas the remaining air flows into the interior of the casing 12 without flowing to the side of the heater core 16.

Figure 6:
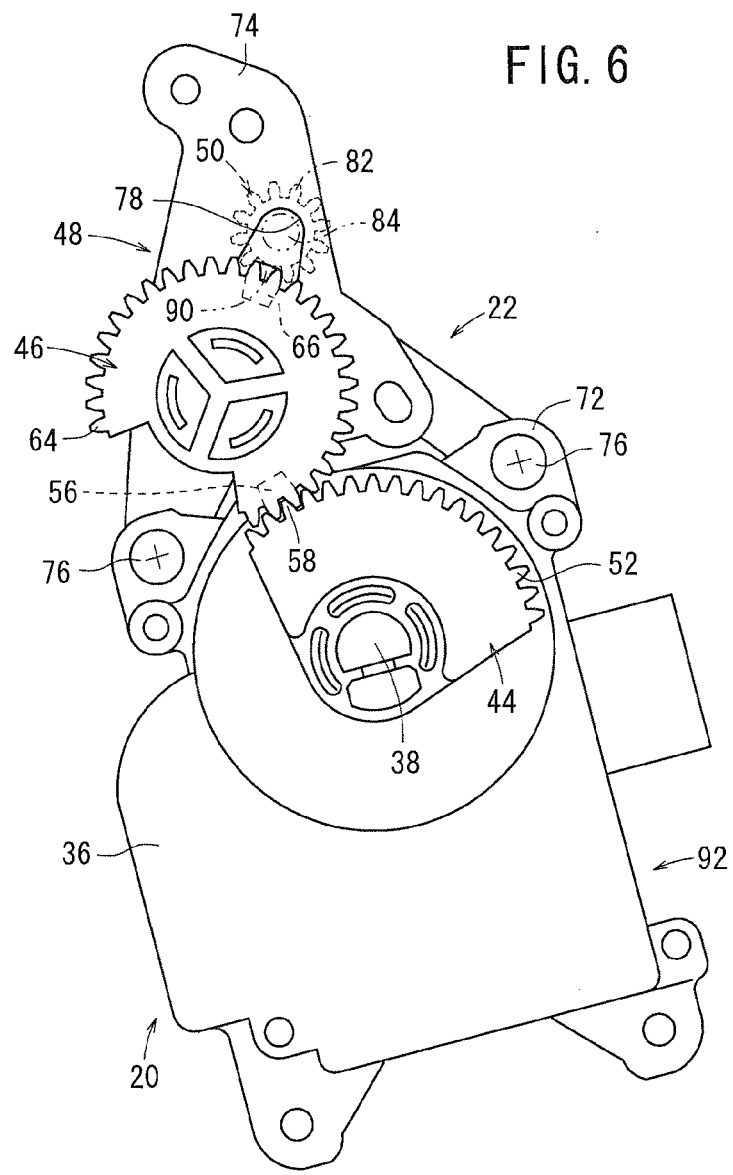
FIG. 6 is a rear view of the driving force transmission unit shown in FIG. 5, as seen from a side of a casing.

As shown in FIGS. 3 to 6, the drive source 20 is made up from a servo motor, for example, rotation of which is controlled based on a control signal from a non-illustrated controller, and includes a housing 36, and a rotary drive shaft 38 disposed substantially centrally in the housing 36 (see FIGS. 4 and 6). In addition, the drive source 20, for example, is fixed with respect to a side surface of the first divided casing 26 via a mounting bracket 40 having a plurality of attachment members. The mounting bracket 40 is formed substantially in a T shape, and is fixed through plural bolts 42 at a position downwardly from the drive source 20 on the first divided casing 26. In this case, the drive source 20 is fixed such that the drive shaft 38 thereof faces toward a side surface of the first divided casing 26, in a state of being separated a predetermined distance with respect to the side surface.

The driving force transmission mechanism 22, as shown in FIGS. 3 to 8, includes a first gear (drive gear) 44 installed on the drive shaft 38 of the drive source 20, a second gear (driven gear) 46 held in mesh with the first gear 44, a gear holder 48 connected to the housing 36 of the drive source 20 and which supports the second gear 46, and a damper shaft 50 accommodated inside the casing 12 and enmeshed with the second gear 46 and with the rack member 32 of the air mixing damper 18.

The first gear 44 is formed in a fan-like shape, and is connected to the drive shaft 38 via a hole formed in a central portion thereof. By being fixed to the drive shaft 38, which is formed with a semicircular shape in cross section, relative rotational displacement between the first gear 44 and the drive shaft 38 is regulated. More specifically, the first gear 44 is rotatably driven in unison (integrally) with drive actions of the drive source 20. The first gear 44 is disposed between the drive source 20 and the side surface of the first divided casing 26.

Further, on the outer circumferential region of the first gear 44, a plurality of first gear teeth (first teeth) 52 of a radially concave/convex shape are formed along the circumferential direction. In the vicinity of opposite ends thereof on the outer circumferential region, a pair of first locator grooves (grooves) 54a, 54b, from which the first gear teeth 52 are lacking, are formed respectively. The first locator grooves 54a, 54b are formed with predetermined widths centrally about the position of a central first gear tooth 52 from among three adjacent first gear teeth 52, and are formed so as to enable insertion therein respectively of first and second locator parts 56, 66 (described later) which make up part of the second gear 46.

The first locator grooves 54a, 54b are formed with substantially trapezoidal shapes in cross section along the thickness direction of the first gear 44. First narrow teeth (meshing teeth) 58 are formed in the first locator grooves 54a, 54b, having a width dimension from a central region of the aforementioned thickness direction to an end surface on the side of the drive source 20. The first narrow teeth 58 are formed to be narrower than the first gear teeth 52 and at the same pitch as the first gear teeth 52. Further, the first narrow teeth 58 are formed with the same cross sectional shape. Stated otherwise, the first narrow teeth 58 are set to have a smaller width dimension than the width of the first gear teeth 52, and are formed at positions corresponding to each of the first locator grooves 54a, 54b, respectively.

The second gear 46 is disposed upwardly of the first gear 44 substantially in the same plane therewith. A shaft member 60, which is provided on and projects from the center thereof, is supported rotatably by insertion into a hole 62 of the gear holder 48. Similar to the first gear 44, on an outer circumferential region of the second gear 46, a plurality of second gear teeth (second teeth) 64 of a concave/convex shape are formed. The second gear teeth 64 are enmeshed with the first gear teeth 52 of the first gear 44. A predetermined region along the circumferential direction of the second gear 46 is reduced in diameter in a radial inward direction, and the second gear teeth 64 are not provided on such a reduced diameter region.

Figure 9:
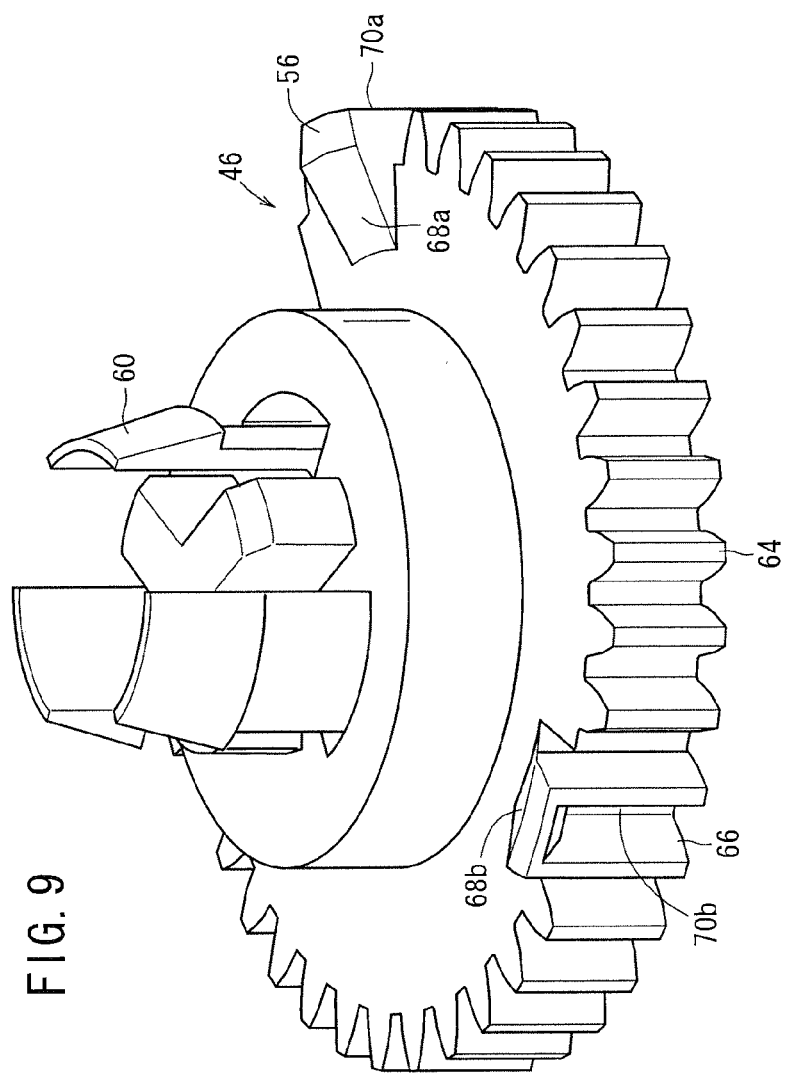
FIG. 9 is an exterior perspective view of a second gear that constitutes part of a driving force transmission mechanism.

Further, in an end part of the outer circumferential region on the second gear 46, the first locator part (engagement member) 56 is formed at a position between the second gear teeth 64, whereas on a central part on the outer circumferential region, the second locator part (engagement member) 66 is formed at a position between the second gear teeth 64. The first and second locator parts 56, 66 are formed respectively by two adjacent second gear teeth 64, and wall portions 68a, 68b that join the second gear teeth 64 to one another. Observed from the outer circumferential direction of the second gear 46, the first and second locator parts 56, 66 are formed with U-shapes in cross section, which open toward the side opposite from the gear holder 48 (see FIGS. 6 and 9).

The first and second locator parts 56, 66 are formed at substantially the same diameter as the tooth-end diameter of the second gear teeth 64, and together therewith, at an inside part surrounded by two of the second gear teeth 64 and the wall portions 68a, 68b, the first and second locator parts 56, 66 include meshing grooves 70a, 70b (see FIG. 8), which engage with a (later described) first narrow tooth 58 and second narrow tooth 90 (meshing teeth).

When the second gear 46 engages with respect to the first gear 44, the first gear teeth 52 and the second gear teeth 64 become enmeshed, and together therewith, upon rotation of the first and second gears 44, 46, the first locator part 56 engages within one of the first locator grooves 54a on the first gear 44, and the second locator part 66 is engaged with respect to the other first locator groove 54b.

Further, when the first and second locator parts 56, 66 are engaged respectively within the first locator grooves 54a, 54b on the first gear 44, the first narrow teeth 58 of the first gear 44 become engaged with respect to the meshing grooves 70a, 70b formed therein, whereupon the driving force from the first gear 44 is transmitted to the second gear 46 via the first narrow teeth 58 and the meshing grooves 70a, 70b.

More specifically, when the driving force transmission mechanism 22 including the first and second gears 44, 46 is assembled, by insertion of the first locator part 56 into the first locator groove 54a of the first gear 44, such parts function mutually as a positioning means for performing positioning in the direction of rotation.
Together therewith, by engagement of the first narrow tooth 58 in the meshing grooves 70a, 70b formed therein, a driving force transmitting function also is provided, by which the driving force from the first gear 44 can reliably be transmitted to the second gear 46.

The gear holder 48 is formed in a substantially triangular shape and tapers from a lower portion toward an upper portion thereof. The gear holder 48 is connected to the housing 36 of the drive source 20 through a first mounting section 72 formed at the lower portion thereof, and is fixed to a side wall of the first divided casing 26 through a second mounting section 74 formed at the upper portion. More specifically, the first mounting section 72 is fastened together to the upper portion of the housing 36 by two bolts 76, whereas the second mounting section 74 is fixed by a single bolt 76 while being separated a predetermined distance from the side surface of the first divided casing 26.

Further, at a substantially central portion of the gear holder 48, the hole 62 is formed through which the shaft member 60 of the second gear 46 is inserted, such that by insertion and fitting of the shaft member 60, the second gear 46 is retained in a rotatable manner. Moreover, the second gear 46 is arranged between a holder and the side wall of the first divided casing 26.

Upwardly of the hole 62, a shaft groove 78 is formed, which extends upwardly in an inclined fashion toward the second mounting section 74. An end of a later-described damper shaft 50 is supported rotatably with respect to the shaft groove 78. The shaft groove 78 is formed in a straight shape while tapering gradually in a direction separating away from the hole 62, the end thereof being formed with a semicircular shape in cross section.

In the interior of the casing 12, a damper shaft 50 is provided that confronts the inner wall surface of the air mixing damper 18, the damper shaft 50 being disposed along the widthwise direction of the casing 12. One end of the damper shaft 50 is supported rotatably with respect to a center plate (not shown) sandwiched between the first divided casing 26 and the second divided casing 28, whereas the other end thereof is inserted into a shaft hole 80 (see FIG. 1) provided in a side of the first divided casing 26.

Figure 10:
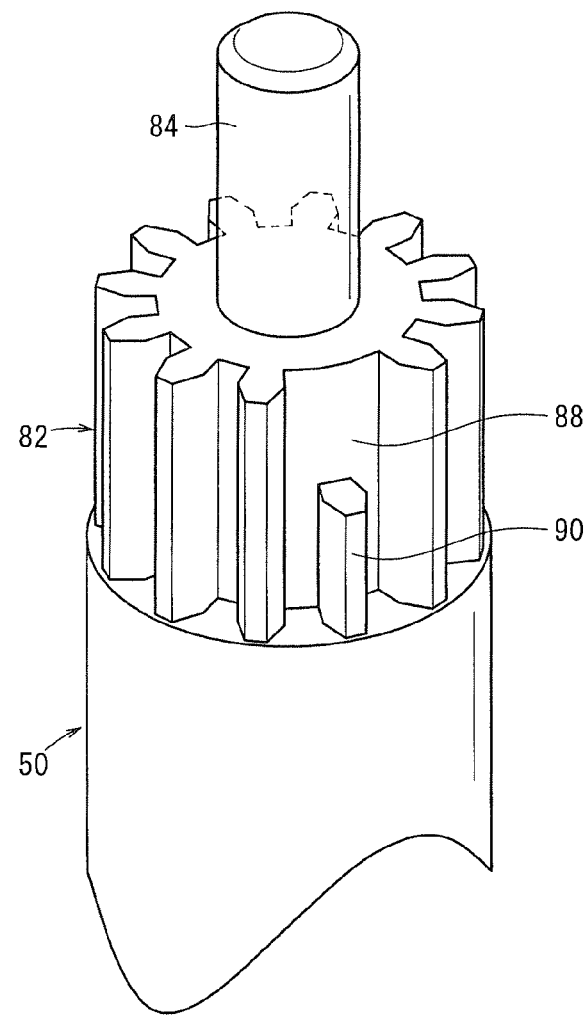
FIG. 10 is an enlarged perspective view showing the vicinity of a damper gear on a damper shaft that constitutes part of the driving force transmission mechanism.

Further, on the other end of the damper shaft 50, as shown in FIG. 10, a damper gear 82 is formed on the outer side of the first divided casing 26, which is enmeshed with the second gear 46. Together therewith, further from the end of the damper gear 82, a support shaft 84 having a radially inward reduced diameter is formed, which is inserted into and supported rotatably in the shaft groove 78 of the gear holder 48. In greater detail, the support shaft 84 is axially supported in the end of the shaft groove 78 that is formed with the semicircular shape in cross section.

More specifically, opposite ends of the damper shaft 50 are supported by the center plate (not shown) and the gear holder 48, such that the damper shaft 50 is supported rotatably in the casing 12.

On the other hand, on the damper shaft 50, pinion gears 86 are formed respectively at positions facing the rack member 32 of the air mixing damper 18 for being enmeshed respectively with respect to the rack member 32. More specifically, by rotation of the damper shaft 50, under engagement of the pinion gear 86 and the rack member 32, the air mixing damper 18 is moved in upward and downward directions along the guide walls 34*a*, 34*b* of the casing 12.

The damper gear 82 has a predetermined width along the axial direction of the damper shaft 50, with a plurality of gear teeth being formed along the outer circumferential surface thereof. In addition, a second locator groove (groove) 88, from which one of the gear teeth is removed, is formed on the damper gear 82. The second locator groove 88 is formed with a predetermined width centrally about the position of a central gear tooth from among three adjacent gear teeth, and is formed so as to enable insertion therein of the second locator part 66 that makes up part of the second gear 46.

The second locator groove 88 is formed along the thickness direction of the damper gear 82. The second narrow tooth 90 is formed in the second locator groove 88, having a width dimension that extends from one end side directing one end of the damper shaft 50 to the other end side thereof, and which is roughly half the width of the other gear teeth. The second narrow tooth 90 is formed at the same pitch and with the same cross sectional shape as the other gear teeth. More specifically, the second narrow tooth 90 is constituted with a width dimension roughly half that of one gear tooth.

Figure 8:
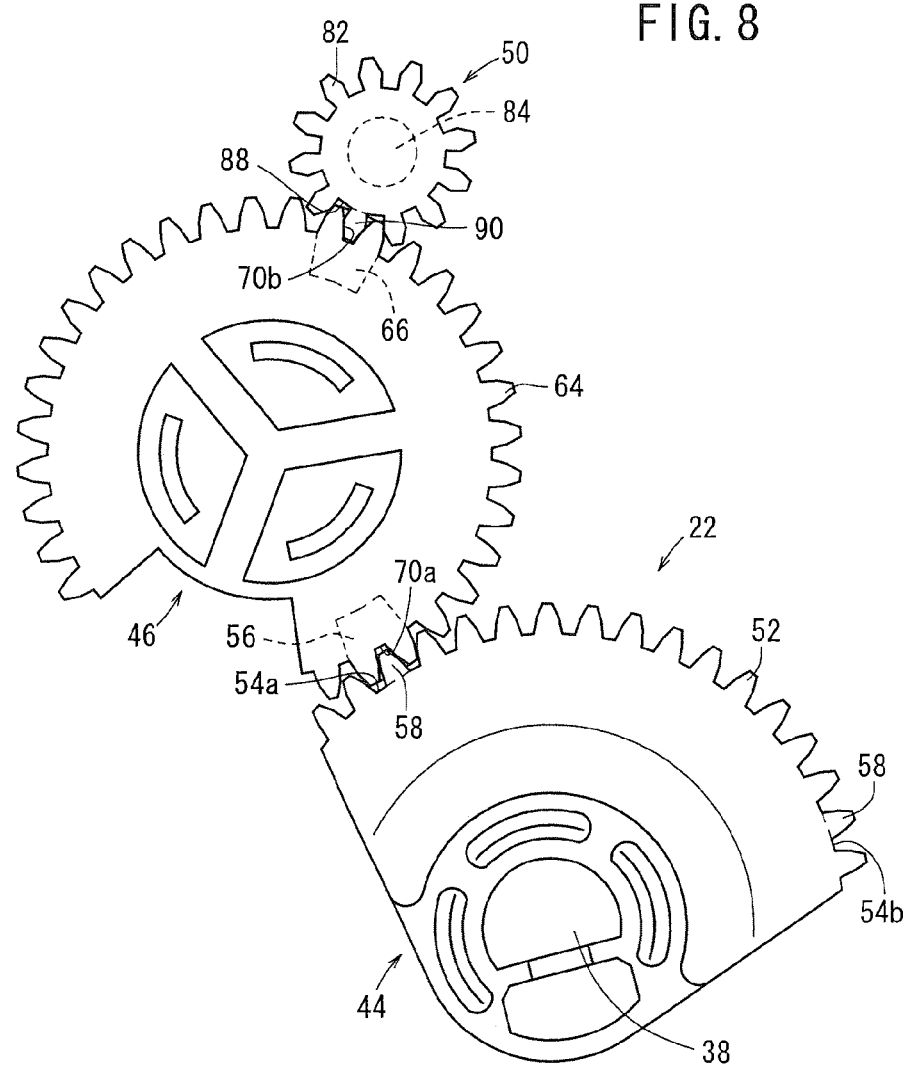
FIG. 8 is a plan view of the enmeshed condition of the first gear, the second gear, and the damper gear shown in FIG. 7, as seen from an opposite side.

Additionally, when the damper gear 82 and the second gear 46 are enmeshed with each other, the second narrow tooth 90 engages within the meshing groove 70*b* in the second locator part 66 (see FIG. 8).

More specifically, when the second gear 46 and the damper gear 82 are assembled, by insertion of the second locator part 66 into the second locator groove 88 of the second gear 46, such parts function mutually as a positioning means for carrying out positioning in the direction of rotation. Together therewith, by engagement of the second narrow tooth 90 in the meshing groove 70*b* formed therein, a driving force transmitting function also is provided, by which the driving force from the second gear 46 can reliably be transmitted to the damper gear 82.

The vehicular air conditioning apparatus 10 to which the driving force transmission mechanism 22 is applied according to the present invention is constructed basically as described above. Next, a situation shall be described by which the driving force transmission mechanism 22 is assembled with respect to the casing 12, the drive source 20, and the air mixing damper 18.

Initially, the first gear 44 is mounted on the drive shaft 38 of the drive source 20, and the first mounting section 72 of the gear holder 48 is fixed by the bolts 76 with respect to the housing 36 of the drive source 20. Additionally, the first locator part 56 of the second gear 46 is inserted with respect to the first locator groove 54*a* of the first gear 44, and in a state where the first narrow tooth 58 engages within the meshing groove 70*a*, the shaft member 60 of the second gear 46 is inserted and fitted into the hole 62 of the gear holder 48.

Owing thereto, in a state where relative positioning in the direction of rotation between the first gear 44 and the second gear 46 is brought about by the first locator part 56 and the first locator groove 54*a*, the first and second gears 44, 46 are assembled through the gear holder 48, thus constituting a driving force transmission unit 92, which is connected integrally to the drive source 20.

Next, the driving force transmission unit 92 is assembled onto a side wall of the first divided casing 26 that constitutes the casing 12. In this case, the mounting bracket 40 already is installed through plural bolts 42 on a lower part of the drive source 20, whereas the air mixing damper 18 and the damper shaft 50 are accommodated in the interior of the casing 12, and the damper gear 82 of the damper shaft 50 is in a state of projecting from the side surface through the shaft hole 80.

In the above-described condition, an operator places the second gear 46 in confronting relation with respect to the first divided casing 26, and while gripping the driving force transmission unit 92 with the mounting bracket 40 oriented downward and the second mounting section 74 on the gear holder 48 oriented upwardly, causes the driving force transmission unit 92 to approach the side surface of the first divided casing 26. Additionally, the support shaft 84 of the damper shaft 50 is inserted through the shaft groove 78 of the gear holder 48, and together therewith, the second gear 46 is made to engage with the damper gear 82 of the damper shaft 50. At this time, assembly is performed such that the second locator part 66 of the second gear 46 is inserted into the second locator groove 88 of the damper gear 82, and further, the second narrow tooth 90 of the damper gear 82 engages within the meshing groove 70*b* of the second locator part 66.

Owing thereto, relative positioning between the second gear 46 and the damper gear 82 in the direction of rotation is brought about by the second locator part 66, and after proper positioning of the second gear 46 and the damper gear 82 has been confirmed, the mounting bracket 40 is fixed to the side surface of the first divided casing 26, while simultaneously, the second mounting section 74 of the gear holder 48 is fixed to the side surface of the first divided casing 26 by the bolt 76.

As a result, the second gear 46, which is supported by the gear holder 48, is assembled onto the side surface of the casing 12 in a state whereby the first gear 44 connected to the drive source 20 and the damper gear 82 of the damper shaft 50 that causes rotary movement (turning) of the air mixing damper 18 are mutually enmeshed respectively with each other. More specifically, the first and second gears 44, 46 and the damper gear 82 are assembled together in a condition of mutual positioning therebetween along the direction of rotation.

Next, operations and effects of the vehicular air conditioning apparatus 10, on which the driving force transmission unit 92 has been assembled in the above manner, shall briefly be explained.

First, the driver, by operating a non-illustrated operation switch for performing temperature adjustment inside the vehicle compartment, causes a control signal to be output with respect to the drive source 20 through a controller (not shown).

For example, in the case that a heating operation is performed in the vehicular air conditioning apparatus 10 shown in FIG. 2, by switching to an operational mode by means of the operation switch, the control signal output to the drive source 20 through the non-illustrated controller is switched, and the drive shaft 38 is rotated under a driving action of the drive source 20. Owing thereto, the first gear 44 is rotated in a clockwise direction (the direction of arrow C1 in FIG. 7), and along therewith, the second gear 46 is rotated in a counterclockwise direction (the direction of arrow D1 in FIG. 7) and the damper gear 82 is rotated in a clockwise direction (the direction of arrow E1 in FIG. 7).

In addition, as a result of the driving force from the drive source 20, the damper shaft 50 is rotated through a predetermined angle in a counterclockwise direction (the direction of arrow D1), whereupon, due to engagement of the pinion gear 86 and the rack member 32, the air mixing damper 18 shown in FIG. 2 is moved upwardly a predetermined distance along the guide walls 34a, 34b so as to separate from the heater core 16.

Owing thereto, the air mixing damper 18, which is fitted to close between the evaporator 14 and the heater core 16, moves, whereupon a portion of the air that has passed through the evaporator 14 flows through the heater core 16, which is disposed downstream from the evaporator 14, and passes to the interior. As a result, a portion of the air, after being heated by the heater core 16, is mixed with air that has passed only through the evaporator 14, whereby the air is adjusted in temperature in the interior of the casing 12. Then, the temperature-adjusted air, after passing through passages inside the casing 12, is blown out into the vehicle compartment from outlet ports, for example, in the vicinity of the feet of passengers in the vehicle.

Figure 7:
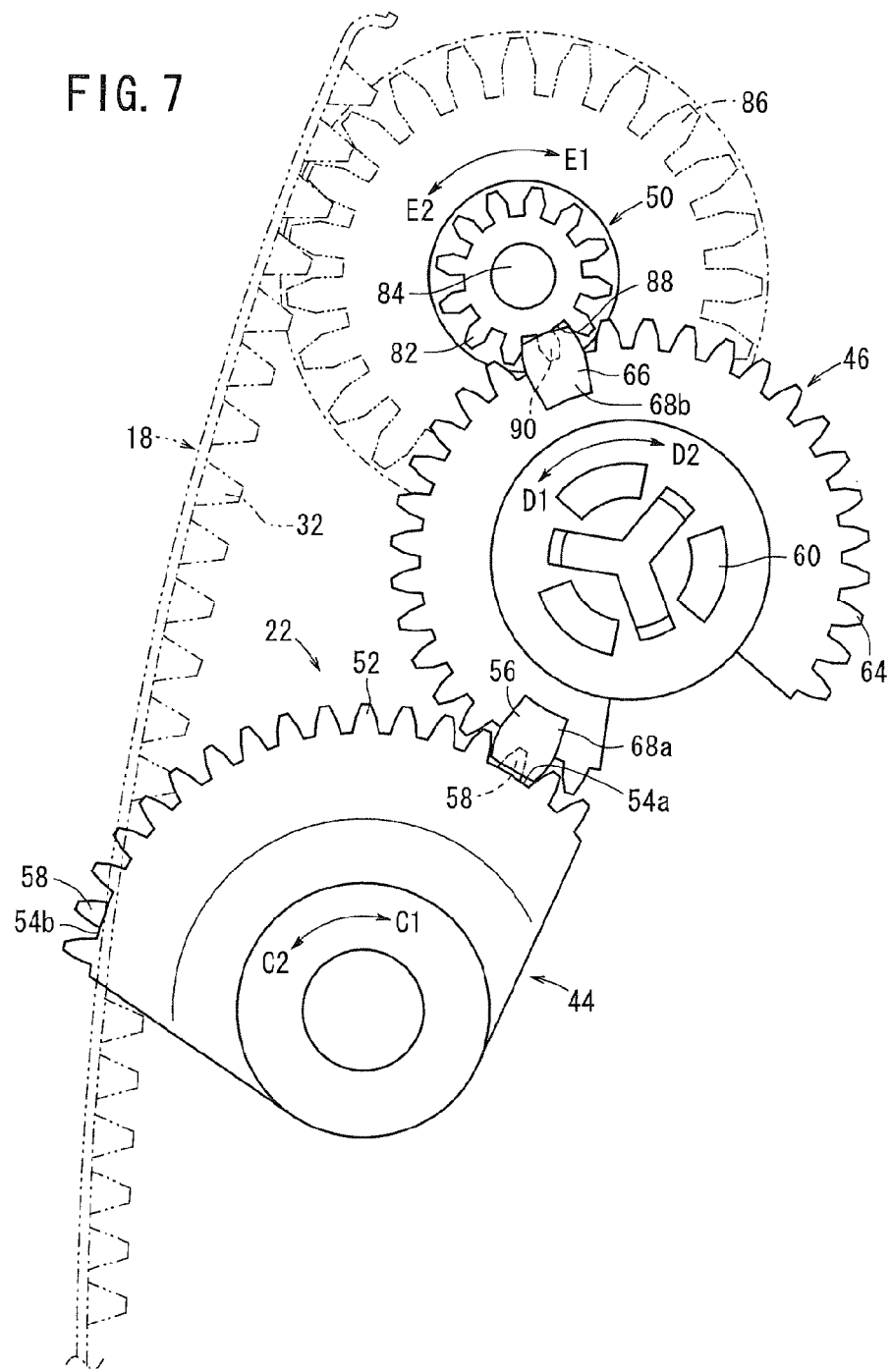
FIG. 7 is a front view showing an enmeshed condition of a first gear, a second gear, and a damper gear that make up the driving force transmission mechanism.

On the other hand, in the case that a cooling operation is performed in the vehicular air conditioning apparatus 10, by switching to an operational mode by means of the operation switch, the drive shaft 38 is rotated in an opposite direction under a driving action of the drive source 20, and the first gear 44 is rotated together with the drive shaft 38 in a counterclockwise direction (the direction of arrow C2 in FIG. 7). As a result, the second gear 46, through engagement with the first gear 44, is rotated in a clockwise direction (the direction of arrow D2 in FIG. 7), and the damper gear 82, through engagement with the second gear 46, is rotated in a counterclockwise direction (the direction of arrow E2 in FIG. 7). Owing thereto, the damper shaft 50 is rotated counterclockwise (the direction of arrow E2) by the driving force from the drive source 20, and the air mixing damper 18, which is engaged with the pinion gear 86 through the rack member 32, is moved along the guide walls 34a, 34b to the downward side facing the heater core 16.

As a result, since the flow of air that has passed between the evaporator 14 and the heater core 16 is blocked by the air mixing damper 18, air (cooled air) supplied from the blower fan and which has passed through the evaporator 14 does not flow through to the side of the heater core 16, but flows directly to the outlet ports through passages inside the casing 12, and is blown out into the vehicle compartment from outlet ports, for example, which are capable of blowing air in the vicinity of faces of passengers in the vehicle.

In the foregoing manner, according to the present embodiment, the first locator groove 54a is disposed adjacent the first gear teeth 52 on the outer circumferential region of the first gear 44 that constitutes the driving force transmission mechanism 22, and by insertion of the first locator part 56 formed on the outer circumferential region of the second gear 46 with respect to the first locator groove 54a, when the first and second gears 44, 46 are intermeshed, relative positioning thereof in the direction of rotation of the first gear 44 and the second gear 46 can be reliably and effectively carried out. Together therewith, similarly, when the second gear 46 and the damper gear 82 of the damper shaft 50 are intermeshed, by insertion of the second locator part 66 of the second gear 46 into the second locator groove 88 of the damper gear 82, relative positioning in the direction of rotation of the second gear 46 and the damper gear 82 can be reliably and effectively carried out.

As a result, when the first and second gears 44, 46 and the damper gear 82 that make up the driving force transmission mechanism 22 are assembled together, assembly thereof can be performed while mutual positioning in the direction of rotation can be performed easily and reliably. Hence, ease of assembly of the driving force transmission mechanism 22 can be enhanced.

Further, when the first and second gears 44, 46 are enmeshed, the first narrow tooth 58 of the first gear 44 is caused to enmesh with respect to the meshing groove 70a formed on the first locator part 56, whereas, when the second gear 46 and the damper gear 82 are enmeshed, the second narrow tooth 90 of the damper gear 82 is caused to enmesh with respect to the meshing groove 70b of the second locator part 66. Owing thereto, at engagement locations of the first and second locator parts 56, 66 on the first gear 44 and the damper gear 82, the driving force can reliably be transmitted under an intermeshing action between the first and second narrow teeth 58, 90 and the meshing grooves 70a, 70b.

Owing thereto, under an engagement action between the first and second locator parts 56, 66 and the first and second locator grooves 54a, 54b, 88, even in the event that relative positioning is carried out amongst the second gear 46, the first gear 44 and the damper gear 82, the driving force from the drive source 20 can be transmitted to the air mixing damper 18 via the first and second gears 44, 46 and the damper gear 82.

More specifically, a structure is provided, which in combination enables both a positioning function in the relative rotational directions of the first and second gears 44, 46 and the damper gear 82, and a driving force transmitting function, which can reliably transmit a driving force from the first gear 44 to the second gear 46 and the damper gear 82.

The driving force transmitting mechanism according to the present invention is not limited to the aforementioned embodiment. It should be understood that various changes and modifications may be made thereto without departing from the scope of the invention as set forth in the appended claims.

What is claimed is:

1. A driving force transmission mechanism having a plurality of gears, for transmitting a driving force from a driving section, comprising:

a drive gear connected to the driving section and having a plurality of first gear teeth on an outer circumferential region thereof;

a driven gear having a plurality of second gear teeth on an outer circumferential region thereof, which are enmeshed with the first gear teeth, the driven gear being enmeshed with the drive gear;

a positioning member provided on the outer circumferential regions of the drive gear and the driven gear, the positioning member being adjacent to the first gear teeth or the second gear teeth, for performing positioning of the drive gear and the driven gear in a direction of rotation thereof; and a meshing member disposed on an interior of the positioning member for causing the drive gear and the driven gear to enmesh mutually, wherein the positioning member further comprises:
a groove disposed on one of the drive gear and the driven gear, the groove being formed by leaving out one end of one of the first gear teeth and the second gear teeth in a rotation axis direction of one of the drive gear and the driven gear so as to have a diameter smaller than a teeth end diameter of the one of the first gear teeth and the second gear teeth; and an engagement member formed on another of the drive gear and the driven gear that does not have the groove, the engagement member being configured to be inserted into the groove, wherein the meshing member further comprises:
one intermediate meshing tooth disposed on one of the drive gear and the driven gear, the meshing tooth being formed with the same diameter as a teeth end diameter of the first gear teeth or the second gear teeth and with a width narrower than a width of the first gear teeth or the second gear teeth; and a meshing groove formed on another of the drive gear and the driven gear that does not have the meshing tooth, the meshing groove being configured to be enmeshed with the meshing tooth, the meshing groove being formed only between a pair of adjacent teeth and being sized to position only the intermediate meshing tooth therebetween, the intermediate meshing tooth being shorter in the width direction than the adjacent teeth in the rotation axis direction of the one of the drive gear and the driven gear, wherein the engagement member is constituted from an adjacent pair of the first gear teeth or the second gear teeth, and a wall portion that adjoins the pair of the first gear teeth or the second gear teeth, the meshing groove being disposed in an interior region surrounded only by the pair of the adjacent first gear teeth or the second gear teeth and the wall portion, wherein the engagement member is formed such that the wall portion protrudes outward from an end of the pair of the first gear teeth or the second gear teeth in a width direction on the another of the drive gear and the driven gear that has the engagement member, wherein the engagement member has a U-shape formed only by the pair of the first gear teeth or the second gear teeth and the wall portion when viewed from a radial direction, and wherein the meshing tooth enmeshes with the meshing groove, in a state where the engagement member is inserted into the groove for performing positioning, and the wall portion enmeshes with the groove, and wherein the meshing groove of the engagement member meshes with the groove and the meshing tooth so as to position the drive gear relative to the driven gear in a first position, prior to rotation of the respective gears.

2. The driving force transmission mechanism according to claim 1, wherein the groove is formed between the adjacent pair of the first gear teeth or the second gear teeth, and the meshing tooth is disposed between one of the first gear teeth or the second gear teeth and another of the first gear teeth or the second gear teeth.

3. The driving force transmission mechanism according to claim 1, wherein the driving force transmission mechanism is used in a vehicular air conditioning apparatus for adjusting air introduced from an exterior or interior of a vehicle to a predetermined temperature and supplying the air to the interior of the vehicle, and wherein a driving force of the driving section is transmitted to a switching damper disposed inside a casing via the drive gear and the driven gear.

* * * * *